(12) United States Patent
Mecklenburg

(10) Patent No.: US 10,522,313 B2
(45) Date of Patent: Dec. 31, 2019

(54) REVERSING LINEAR SOLENOID

(71) Applicant: RHEFOR GBR, Berlin (DE)

(72) Inventor: Arno Mecklenburg, Berlin (DE)

(73) Assignee: RHEFOR GBR, Berlin (DE)

( * ) Notice: Subject to any disclaimer, the term of this patent is extended or adjusted under 35 U.S.C. 154(b) by 0 days.

(21) Appl. No.: 15/159,462

(22) Filed: May 19, 2016

(65) Prior Publication Data
US 2016/0268031 A1  Sep. 15, 2016

Related U.S. Application Data

(63) Continuation-in-part of application No. 15/031,717, filed as application No. PCT/DE2014/100374 on Oct. 19, 2014, now Pat. No. 10,181,373.

(30) Foreign Application Priority Data

Oct. 23, 2013 (DE) .......... 10 2013 017 508
Apr. 5, 2014 (DE) .......... 10 2014 004 888
(Continued)

(51) Int. Cl.
*H01F 7/16* (2006.01)
*F16K 31/06* (2006.01)
(Continued)

(52) U.S. Cl.
CPC ..... *H01H 51/2209* (2013.01); *F16K 31/0675* (2013.01); *H01F 7/122* (2013.01);
(Continued)

(58) Field of Classification Search
CPC .......... H01F 7/122; H01F 7/16; H01F 7/1607; H01F 7/1615; H01F 7/1646;
(Continued)

(56) References Cited

U.S. PATENT DOCUMENTS 4,439,700 A   3/1984  Menzel et al.
4,829,947 A   5/1989  Lequesne
(Continued)

FOREIGN PATENT DOCUMENTS

CN   101929563 A   12/2010
DE     4304921 C1    8/1994
(Continued)

OTHER PUBLICATIONS

Mecklenburg, A., "Reversing LInear Solenoid," U.S. Appl. No. 15/031,717, filed Apr. 22, 2016, 35 pages.
(Continued)

*Primary Examiner* — Bernard Rojas
(74) *Attorney, Agent, or Firm* — McCoy Russell LLP

(57) ABSTRACT

A reversing linear solenoid polarized in a permanent magnetic manner having a first and second end stroke position as well as at least one armature, wherein it has a spring system or is operated at such a spring system which exerts a force in the direction of the center stroke position on the armature or armatures in the end stroke position(s). The spring system and the reversing linear solenoid are coordinated with one another such that the armature or armatures are held in a permanent magnetic manner against the spring force in both end stroke positions. The spring system is configured such that the potential energy (elastically) stored by movement of the armature or armatures into its/their end stroke movements is of equal magnitude. If external restoring forces caused by the application are present, they must be taken into account in the design of the spring system.

22 Claims, 7 Drawing Sheets

(30) Foreign Application Priority Data

Jun. 1, 2014 (DE) .................. 10 2014 007 771
Sep. 22, 2014 (DE) .................. 10 2014 013 723

(51) Int. Cl.
*H01H 51/22* (2006.01)
*H01F 7/122* (2006.01)

(52) U.S. Cl.
CPC ....... *H01F 7/1607* (2013.01); *H01H 51/2263* (2013.01); *H01H 2051/2218* (2013.01)

(58) Field of Classification Search
CPC ....... H01H 2051/2218; H01H 51/2209; H01H 51/2263; F16K 31/0675
USPC .................................................. 335/220–226
See application file for complete search history.

(56) References Cited

U.S. PATENT DOCUMENTS

| | | | |
|---|---|---|---|
| 6,028,499 A | 2/2000 | Oudet et al. | |
| 6,308,667 B1 * | 10/2001 | Tsai | F01L 9/04 123/90.11 |
| 6,737,946 B2 * | 5/2004 | Seale | F16K 31/0675 251/129.15 |
| 6,791,442 B1 | 9/2004 | Schmidt | |
| 7,280,019 B2 * | 10/2007 | Kolb | H01F 7/1615 335/229 |
| 8,188,821 B2 | 5/2012 | Nelson | |
| 8,228,149 B2 | 7/2012 | Puth et al. | |
| 8,710,945 B2 * | 4/2014 | Wygnanski | H01F 7/1646 335/229 |
| 9,033,309 B2 * | 5/2015 | Rampen | F04B 7/0076 251/129.15 |
| 9,478,339 B2 * | 10/2016 | Gilmore | H01F 7/122 |
| 2006/0231050 A1 | 10/2006 | Lewis et al. | |
| 2008/0284261 A1 | 11/2008 | Andrieux et al. | |

FOREIGN PATENT DOCUMENTS

| | | |
|---|---|---|
| DE | 19509195 A1 | 9/1996 |
| DE | 10146899 A1 | 4/2003 |
| DE | 10207828 A1 | 9/2003 |
| DE | 10310448 A1 | 9/2003 |
| DE | 102010044812 A1 | 3/2012 |
| EP | 0114354 A2 | 8/1984 |
| EP | 2822004 A1 | 1/2015 |
| FR | 2934923 A1 | 2/2010 |
| GB | 2197754 A | 5/1988 |
| GB | 2325567 A | 11/1998 |
| WO | 03030188 A1 | 4/2003 |
| WO | 2011003547 A1 | 1/2011 |

OTHER PUBLICATIONS

ISA European Patent Office, International Search Report Issued in Application No. PCT/DE2014/100374, dated Jun. 10, 2015, WIPO, 13 pages.
State Intellectual Property Office of the People's Republic of China, Office Action and Search Report Issued in Application No. 201480058700.4, dated Sep. 18, 2017, 16 pages.

* cited by examiner

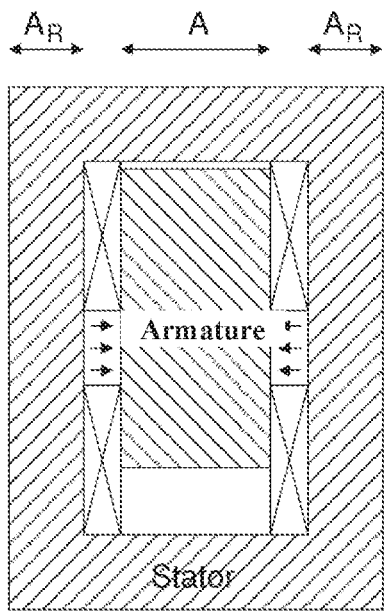
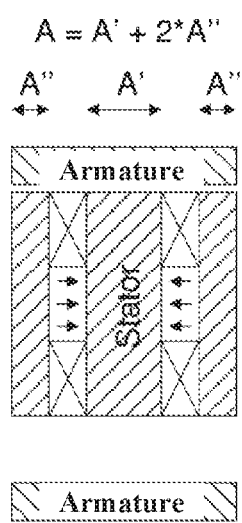
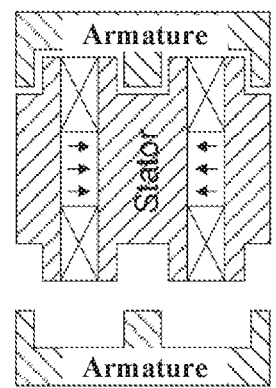
Fig. 2A
Fig. 2B
Fig. 2C
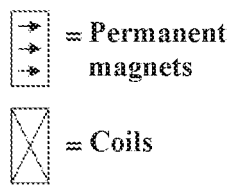
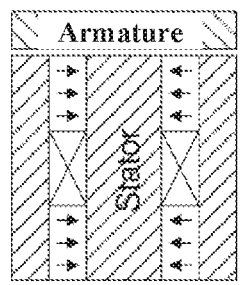
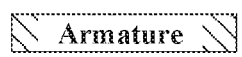
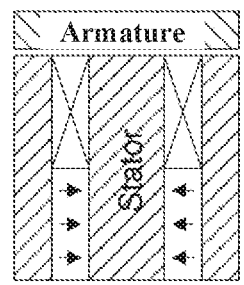
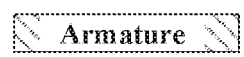
Fig. 2D
Fig. 2E

REVERSING LINEAR SOLENOID

CROSS REFERENCE TO RELATED APPLICATIONS

The present application is a continuation-in-part of U.S. patent application Ser. No. 15/031,717, entitled "Reversing Linear Solenoid," filed on Apr. 22, 2016, which is a U.S. National Phase Patent Application of International Patent Application Serial No. PCT/DE2014/100374, entitled "Electromechanical Actuator," filed on Oct. 19, 2014, which claims priority to German Patent Application No. 10 2014 013 723.6, filed on Sep. 22, 2014, and German Patent Application No. 10 2014 007 771.3, filed Jun. 1, 2014, and German Patent Application No. 10 2014 004 888.8, filed Apr. 5, 2014, and German Patent Application No. 10 2013 017 508.9, filed Oct. 23, 2013, the entire contents of each of which are hereby incorporated by reference in their entirety for all purposes.

TECHNICAL FIELD

The present disclosure relates to the field of electromagnetic actuators, for example to a reversing linear solenoid.

BACKGROUND AND SUMMARY

Reversing linear solenoids are generally known and form the prior art. For example, bistable designs are used for driving electrical medium-voltage switching devices, with electrolytic capacitors being needed for the power supply of the magnets. Further fields of use can be found, for example, in solenoid valves which should be able to maintain a state against a returning force without any control current. In addition, there is a high number of further applications, inter alia in sorting and conveying plants, but also in the automotive sector (in particular transmission engineering, central locking systems, shift locks) as well as in knitting machines. Important possible areas of use are also present in the field of so-called hot-runner engineering (actuating the needles of injection molding tools) and in the field of robot welding tongs (tracking the welding electrode, with the required clearance compensation being able to be ensured by springs).

A disadvantage of known reversing linear solenoids, which frequently precludes their use instead of pneumatic or hydraulic drives (or spring accumulators locked by force transmission), is their frequently small electrical efficiency. This results in substantial costs in medium-voltage switching devices using (bistable) reversing linear solenoids, primarily due to the expensive electrolytic capacitors. In other fields of the art, in particular with valves in engines—for example gas valves in large gas engines—the small electrical efficiency results in an unwanted limitation of the permitted frequency or occurrence of switching by the power loss occurring in the coils (the coils would be thermally destroyed at higher switching frequencies).

A further disadvantage of known reversing linear solenoids is their small dynamics since, in particular with comparatively long-stroke drives (long-stroke in comparison with the magnet diameter), only a small initial force is frequently available and, in addition, comparatively large tolerances are unavoidable. For instance, power switches should disconnect short-circuits from the mains as fast as possible in switching off or should impact the zero crossing of the current or that of the voltage on switching on; high dynamics with short dead times are required for this purpose—this is only insufficiently possible using conventional reversing linear solenoids.

Finally, a disadvantage of known bistable reversing linear solenoids can be seen in the fact that they tend to show the highest armature speed when the armature reaches an end stroke position at the end of an adjustment procedure. This results in a high effort for the end position damping or restricts the service life of the magnet.

In some applications, above all in valves and electrical switching devices, reversing linear solenoids should be monostable instead of bistable optionally to be able to adopt a safe end position without any control current.

It is therefore the underlying object of the present disclosure to increase the electrical efficiency of polarized reversing linear solenoids, in particular of polarized bistable reversing linear solenoids. The new magnets should furthermore be able to have dynamics which are high in comparison with known reversing linear solenoids with reduced dead times. In addition, a common demand on actuators is a compact construction.

SUMMARY OF THE PRESENT DISCLOSURE

The named object is achieved by a drive in accordance with one of the independent claims. Various embodiments, further developments and applications are the subject of the dependent claims.

In accordance with an example of the present disclosure, the reversing linear solenoid with permanent magnetic polarization has a spring system which exerts a force on the armature in both end stroke positions, the force being directed in the direction of movement toward the center stroke position (i.e. toward the center between the two end stroke positions). In this respect, the spring system is to be designed such that the spring force in at least one end stroke position is smaller in magnitude than the total reluctance force acting on the armature in the static, non-energized case so that the armature can be kept stable in a permanent magnetic manner against the spring force in at least one end position.

Not only spring systems having mechanical springs can be considered, but also magnetic or pneumatic spring systems. What is decisive is that a force acting in the direction of the center stroke position disposed between both end stroke positions can be transmitted to the armature or to the armature system in both end stroke positions. The spring system is to be configured for bistable magnets such that the potential energy stored in the spring system is, where possible, the same in both end stroke positions. The spring force must be smaller in magnitude in both end stroke positions than the associated reluctance force in the static, non-energized case. If the application to be provided by the reversing linear solenoid itself produces a returning force, this must be taken into account accordingly in the design of the spring system. This is the case, for example, with vacuum power switches whose contact pressure springs are to be understood as part of the spring system here.

The drives in accordance with the present disclosure should be able to be configured such that they can produce greater forces with respect to their volumes (than know reversing linear solenoids). Ultimately, the drive should also be able to be designed as monostable and should nevertheless be able to have short adjustment times and high efficiencies.

The present disclosure will be explained in more detail in the following with reference to examples shown in the Figs.

The illustrations are not necessarily to scale and the present disclosure is not only restricted to the aspects shown. It is rather important to show the principles underlying the present disclosure.

BRIEF DESCRIPTION OF THE FIGURES

FIG. 2A shows a basic construction of a drive in accordance with examples of the present disclosure.

FIG. 2B shows another example of construction of a drive in accordance with the present disclosure.

FIG. 2C shows another example of construction of a drive in accordance with the present disclosure.

FIG. 2D shows another example of construction of a drive in accordance with the present disclosure.

FIG. 2E shows another example of construction of a drive in accordance with the present disclosure.

DETAILED DESCRIPTION OF THE EMBODIMENTS

Figure 1A:
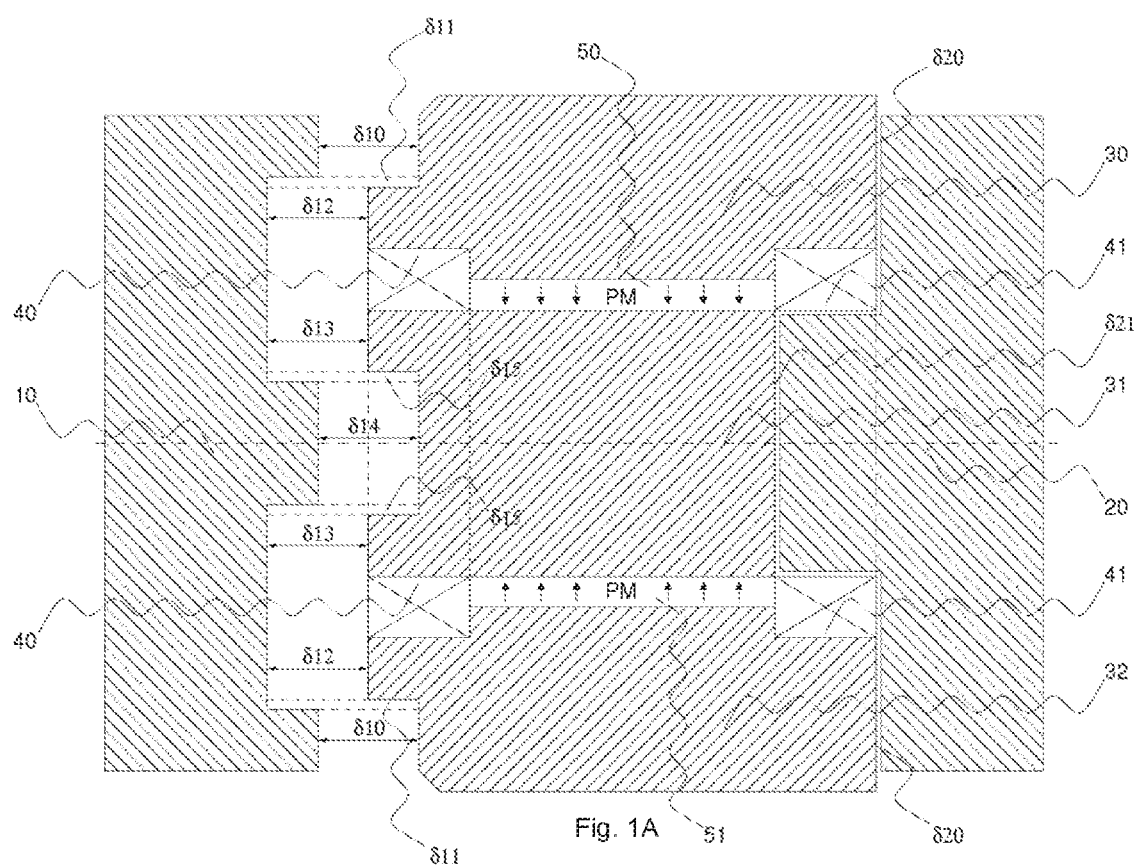
FIG. 1A shows a section, approximately to scale, in parallel with the direction of movement and in the mirror plane of a drive in an embodiment with two armatures or two armature plates in accordance with an example of the present disclosure.

The present disclosure will first be explained in the following for the example of bistable reversing linear solenoids. As a result of the spring system, the armature is set into movement from every end stroke position in the direction of the center stroke position as soon as the retaining force (the retaining force is defined as the total reluctance force on the armature in the respective end stroke position) becomes smaller in magnitude than the spring force as the result of an electrical counter-excitation. For this purpose, a much smaller electrical power is required than with conventional bistable reversing linear solenoids without a spring system; the associated (external) force slew rate can also be much higher. For example, it also approximately applies in the start stroke position in a conventional bistable reversing linear solenoid:

$$F_{ext}=(F_{Gap1}+F_{Gap2})-F_{Abutment}=1/(2*\mu 0)*(A1*B_{Gap1}^2+A2*B_{Gap}^2)-F_{Abutment}$$

where A1 and A2 are the (opposite) pole surfaces of the armature and $F_{Abutment}$ is a function mapping the end position abutments.

Let it be assumed for illustration that the air gap Gap2 is closed except for a residual air gap and this residual air gap conducts a flow having a density of 2T ($B_{Gap2}$=2T), while air gap Gap1 is completely open and does not conduct any flow (($B_{Gap1}$=0T). So that the sum of the opposite reluctance forces $F_{Gap1}+F_{Gap2}$ acting on the armature changes sign along the axial direction of movement of the armature, the flux density in Gap1 has to be larger than the flux density in Gap2 under the condition A1=A2. A large electrical power can be required for this purpose since Gap1 is fully open. In the simplest approximation, the current required for generating a given flux density in the air gap is proportional to the air gap length; however, the associated power loss is the square of the current.

It can be assumed for very small strokes, while neglecting the stray field and eddy currents (static or quasi-static case), that the flux density stroke generated by the counter-excitation in both air gaps Gap1 and Gap2 is of the same magnitude. In this case, which is most favorable for conventional bistable reversing linear solenoids, a flux density stroke would be necessary in the present example of 1T in each case (Gap1: 0T→1T, Gap2: 2T→1T) in order only to compensate the retaining force completely.

Let the same magnet now be equipped with a spring system in accordance with the present disclosure which, in the previously described start stroke position (position "0") exerts a force FSpring (0) in the direction of the center stroke position which can be said to be half as much as the (retention) force. A reduction of the flux in Gap2 from 2T to (sqrt(2))T is thus sufficient to allow the reluctance force acting on the armature via Gap2 to become of equal magnitude with the spring force. The reluctance force acting on the armature via Gap1 is thus already available for accelerating the armature; and indeed with a flux density stroke (at Gap2) of only −0.59T. If, as in the preceding example, the flux density in Gap2 is reduced as a result of electrical counter-excitation from 2T to 1T and if it is increased in Gap1 from 0T to 1T, half of the spring force ($F_{Spring}-F_{Gap2}$ at $B_{Gap2}$=1T is actually available for accelerating the armature in the start stroke position 0 plus a reluctance force $F_{Gap1}$ which produces a quarter of that force at 1T which would be produced at T2. Under the same assumption of A1=A2, this is a force of approximately the same magnitude as the force produced by the spring. The drive can thus produce a force at a flux density stroke of 1T (+1T in Gap1, −1T in Gap2) directly in the start stroke position despite a fully open working air gap Gap1, which force corresponds to approximately half the retaining force, corresponding to the spring force used. It can already be seen in this rough approximation to a particularly favorable case for conventional bistable reversing linear solenoids that drives in accordance with the present disclosure require a much smaller electrical power to be set into movement—with the drive advantageously being configured such that the larger part of the energy initially accelerating the armature is taken from the spring system and is not electrically expended, for instance. It can further be seen that the armature movement can already be made possible at much smaller flux density strokes, in comparison with conventional magnets, which in turn allows short dead times (naturally at the cost of the effective retaining force which results from the sum of the spring forces and reluctance forces).

It is important for the understanding of the present disclosure that the armature can first be accelerated primarily with spring force, for which purpose a comparatively small electrical power take-up is required (for counter-excitation). Moving or accelerated electrical machines can have much higher electrical efficiencies than those which start from an idle state. This is ultimately due to the fact that the work carried out by the drive is an integral of the force over the adjustment path, but the heat loss is an integral of the power loss over time. It is thus clear that a cut in the adjustment time, that is a reduction in the integration interval in the time domain, will tend to result in an increase of the electrical efficiency. It is equally clear that a "seizing" of the armature in any position has to produce an efficiency of zero since the work integral disappears and the integration time escalates.

It is therefore an aspect of the example in accordance with the present disclosure described here that only a small counter-excitation which can be produced quickly is required for triggering the movement. A further aspect comprises the fact that a symmetrical spring system could move the armature to and fro between its end positions within a specific period in the absence of magnetic fields and in the absence of friction, without any energy having to be used for this purpose. The spring system has to be designed for this purpose such that the (potential) energy elastically stored therein is, where possible, of equal magnitude, in both end stroke positions. With a spring system designed in this manner, only the above-named counter-excitation has to be produced and only so much electrical power has to be supplied to the drive that it can be set in motion, can overcome the friction and such that, optionally, useful work can additionally be carried out. In contrast to this, with the conventional bistable reversing linear solenoids, a much larger counter-excitation first has to be produced, which is associated with corresponding ohmic losses. The armature then has to be accelerated only with the aid of electrical power, which takes place comparatively slowly and is therefore likewise energy-intensive. The magnet must also overcome friction and carry out useful work, but actually with an in turn low efficiency, inter alia due to the long adjustment times due to the typically small force and force slew rate at the stroke start. The conventional bistable reversing linear solenoid usually reaches its highest armature speed when the armature impacts the stroke end. In this respect, the kinetic energy communicated to the armature is converted into heat, sound and, unavoidably also into the plastic deformation of drive components. This high kinetic energy as a result of the high speed on the impact into the end stroke position is, on the one hand, wasted for the purpose of the drive, where applicable, and it otherwise threatens its service life through strong wear and, where required, makes a complex and expensive end position damping necessary. In contrast to this, with drives in accordance with the present disclosure, the kinetic energy of the armature (and optionally of further parts, e.g. at the application side, mechanically associated therewith) is in turn largely stored in the spring system ("recuperated") and is thus available for a following adjustment procedure in the opposite direction (apart from (friction) losses).

In summary, drives in accordance with the present disclosure as a rule have to carry out less work than conventional reversing linear solenoids in order to be able to move from one end stroke position into the other in finite time. And as a result of the "pre-acceleration" by the spring system, they can also carry out this smaller required work at a higher electrical efficiency. This results in correspondingly small power losses and allows higher switching frequencies, where they have up to now been limited by the loss power or (integral) heat loss.

With small strokes, that is when the working air gaps can be assumed in a good approximation as "small" or "short", the drives forming the subject of the present disclosure have large advantages over conventional bistable reversing linear solenoids. The dead time of the drives described here is as a rule smaller; the adjustment time is smaller; the efficiency is higher; the end position speed is in turn smaller. The innovative magnets in a bistable design admittedly have at least one snap-in point which does not correspond to any end stroke position as a result of the spring system in the non-energized case. The magnets can, however, easily be designed such that the armature is nevertheless magnetically conveyed into the sought end stroke position against the returning force of the spring system. On operation at a switchable (constant) voltage source, the magnet can be configured such that it does not nearly reach its equilibrium current as a result of counter-induction from the coil or coils on a regular adjustment process. If now, as a result of the behavior of the mechanical load, for example a high friction, the drive is "captured" in the environment of its snap-in point, the current increases and thus, with a certain delay due to self-induction and eddy current effects, the reluctance force which acts on the armature and can ultimately always be sufficient to tension the spring system again and to convey the armature into the sought end position.

With long-stroke drives (i.e. the stroke in the longitudinal direction is longer than the width of the air gap in the transverse direction) in which the above approximation of the "small air gap" is not satisfied, a snapping-in in the spring system is in contrast more easily possible. A remediable weakness of the long-stroke design of the drive can also be seen here: The highest armature speed can be reached, in dependence on the design of the spring system and on the load behavior, in the region of the center stroke position, that is when the working air gaps of the simple armature are wide open. Wide-open air gaps, however, produce low "force constants" (actually force functions), i.e. a given current only produces a small reluctance force. This contradicts the above-described purpose—just where the highest armatures speeds can be achieved with an additional drive by the spring force, where consequently a high electrical efficiency can theoretically be mapped, the "force constants" at the drive in accordance with the present disclosure are small without characteristic influence, which can impair the advantage of the present disclosure.

Drives in accordance with the present disclosure are therefore advantageously to be equipped with a means for characteristic influencing if their strokes are so large that the associated working air gaps cannot be approximated as "small" in every regular operating state. If this means is a geometrical characteristic influencing, it has to be matched to the spring system in accordance with the present disclosure. The characteristic influencing can also reduce the series reluctance of the working air gaps and thus help to minimize the required trigger power.

A further disadvantage of conventional bistable reversing linear solenoids can be seen in the fact that they have an external flux guidance. The flux produced in a permanent magnetic manner has to be fed into the armature, on the one hand, and has to be supplied about at least one coil to the pole surfaces (generally the front surfaces) of the armature. This results in a in increased drive cross-section.

If the drive in accordance with the present disclosure should have a particularly compact construction shape, it comprises two or more frame parts of a soft magnetic material between which a magnetic tension is generated in a permanent magnetic manner. The drive furthermore comprises at least two soft-magnetic armature parts (armature plates in the following), namely the first and second armature plates, which are rigidly connected to one another. In accordance with the present disclosure, the drive has two end stroke positions, namely a first and a second end stroke position. The drive is configured such that, in a first end stroke position, the first armature plate magnetically short-circuits the frame parts, except for unavoidable residual air gaps, whereas the working air gaps at the second armature plate are open to a maximum. In a second end stroke position, the second armature plate correspondingly magnetically short-circuits the frame parts and the working air gaps at the first armature plate are open to a maximum. A compulsory displacement of the armature parts (armature plates here) rigidly connected to one another from the first end stroke position into the second accordingly has the result that the flux produced in a permanent magnetic manner primarily commutates from the first to the second armature plate. (The working air gaps of both armature plates (toward the frame) are connected magnetically in series with one another with respect to the magnetic flux produced with the aid of the drive coil(s). The named working air gaps of the two armature plates are connected magnetically in parallel with respect to the flux produced in a permanent magnetic manner).

Figure 1B:
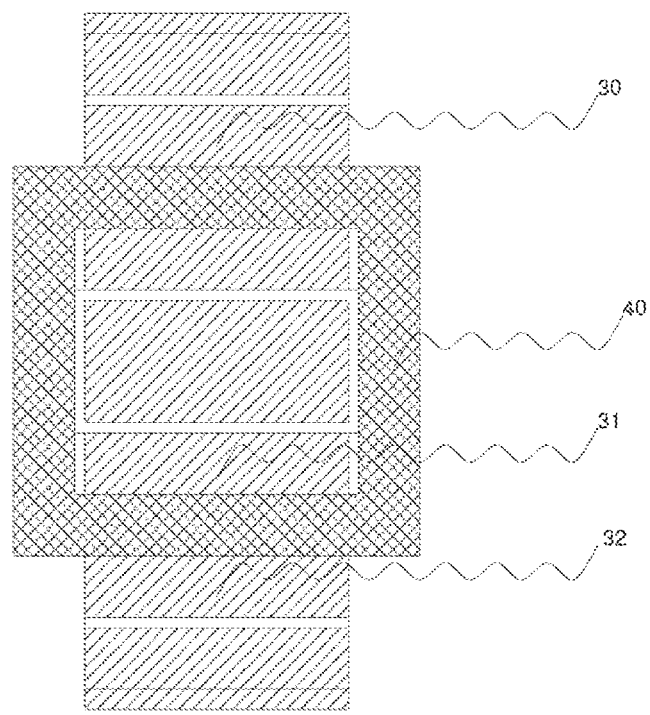
FIG. 1B shows a section perpendicular to the direction of movement through the air gaps 10-14 of the drive in accordance with FIG. 1A.

FIG. 1A shows a side view, FIG. 1B a frontal view of a drive in accordance with the present disclosure almost to scale in an embodiment having two armatures or armature plates (in general armature parts). Though not shown in FIG. 1A, the spring system shown in FIG. 7 may be included in the embodiment. Such a spring system, comprising springs 61 and 62, can be easily designed by any skilled person according to the measures of the claims, optionally coordinated with a specific application. The rigid mechanical connection 60 (cf. FIG. 7) of both armatures, though not shown in FIG. 1A, may be included with the embodiment. The rigid mechanical connection can be designed by the skilled person using his routine skill, for example in the form of an arrangement of rods.

FIG. 1A shows in a side view the electric sheet packets 30, 31 and 32 which form the frame of the magnet. In this respect, the inner frame part 31 is magnetically set under tension against the outer frame parts 30, 32 by the permanent magnets 50, 51. The magnet has two coils 40, 41 which can, for example, be connected in series or can be energized separately. They are, however, typically energized in the same sense. As mentioned, the magnet has two armatures (armature plates), namely 10 and 20. Armature 20 does not have any geometrical characteristic influencing in a narrower sense due to radial "air gaps" produced from the coil 41—its design serves the maximization of the reluctance force which is "communicated to armature 20 via its working air gaps $\delta 20$ and $\delta 21$.

The armature 10 and the frame are formed in contrast as an armature/armature counterpiece system which greatly increases the degree of utilization of the magnets on attracting the armature 10. The armature/armature counterpiece system of armature 10 and the frame parts 30, 31, 32 comprises the working air gaps $\delta 10$, $\delta 12$, $\delta 13$, $\delta 14$ which occur doubled due to the mirror symmetry of the drive, but are termed in the singular. The same applies to the radial air gaps $\delta 11$ and $\delta 15$ which are likewise parts of the geometrical characteristic influencing. As can be seen in FIG. 1B, the drive has a coil with a square core. This is advantageous, but not necessary. The armatures 10 and 20 are preferably likewise made up of soft magnetic metal sheet packets. Since drives in accordance with the present disclosure can have high dynamics, comparatively high demands are made on the eddy current damping such as can be realized with the aid of typical metal sheet packets. The use of metal sheet packets is above all recommended for the design of parallelepiped-shaped magnets (those whose magnetic circuits have only two or three mirror planes in a first approximation). The magnetic circuits of smaller rotationally symmetrical/cylindrical magnets in accordance with the present disclosure can be made up of the typical soft-magnetic solid materials (for example, pure irons, ferrite steels, Fe—Si alloys, alloys based on Fe—Co). The skilled introduction of slits, in particular into the armature or armatures, is helpful for an additional damping. Particularly short dead times and very small eddy current losses (in the "iron") can be achieved with the aid of soft-magnetic composite materials (e.g. 3P Somaloy 1000, so-called SMC materials). These SMC materials can also be converted by means of powder injection molding into components having complex three-dimensional geometries. This, for example, also allows the formation in rotationally symmetrical drives of "chambers" in which permanent magnets can be accommodated. The webs ("traverses") of SMC material necessarily forming the chambers admittedly form magnetic short-circuits in such constructions; however, they can be designed such that they saturate magnetically or in this respect produce sufficiently small flux. In a similar manner, chambers for receiving permanent magnets can also be formed in metal sheet packets in that some metal sheets are designed as continuous while others have cut-outs; a honeycomb structure for receiving permanent magnets can hereby result which is also mechanically very robust, that is stiff.

It is in particular obvious with rotationally symmetrical drives, but also with parallelepiped drives in accordance with the present disclosure having two armatures to implement the rigid connection between the armatures by a centrally arranged rod which extends, for example, coaxially to the cylinder axis with cylindrical magnets. If this rod connected to the armatures is surrounded by the drive coil or coils, it can advantageously itself comprise soft magnetic material and serve the flux guidance. This additional flux naturally has to be taken into account accordingly in the dimensioning of the pole surfaces.

The schematic representation of FIG. 1A and FIG. 1B is to scale such that it can serve as a good basis for FEM simulations. In order to map a drive in accordance with the present disclosure from this, the characteristic of the spring system in accordance with the present disclosure, shown in FIG. 7, should be taken into account in the simulation. The optimization of the drive by varying the spring function, the copper electrolyte level, numbers of windings, etc. belongs to the daily work of the skilled person entrusted with the FEM simulation of electrical drives.

FIGS. 2B, 2C, 2D, 2E schematically show different drive constructions in comparison with a conventional reversing linear solenoid 2a, even different topologies. All the drives shown should be assumed to be of parallelepiped shape and optionally as composed of metal sheet packets. Drives in accordance with the present disclosure can naturally be devices in all the manners of construction shown and in combinations thereof; the advantage which the embodiments having two armatures (2B-E) have with respect to the construction size is obvious since the pole surfaces across the working air gaps of all drives shown schematically, but comparatively to scale, here are of equal magnitude. Drives having two armatures can therefore be of much more compact construction than those only having one armature, above all since the external flux return is omitted. It is also an advantage for the dynamics of magnets in accordance with the present disclosure having two armatures that the total armature mass can be smaller than with magnets of conventional geometry (as in 2a) for two reasons: First, the higher pole pitch allows comparatively thin "armature plates"; second, the (total) armature mass to be moved does not increase to the same extent as the nominal stroke of the magnet increases, just as little as with an increasing coil length or permanent magnet length.

If only a small cross-section is required for carrying out the present disclosure and if the construction length is, if anything, insignificant, two stators polarized in a permanent magnetic manner and one single armature can also be used instead of two armatures and one single stator polarized in a permanent magnetic manner. Such embodiments admittedly require approximately double the amount of permanent magnet materials (per effective pole surface) and are also approximately twice as long in construction than those drives having two armatures. However, with a correct design, they can have particularly high dynamics, at least in short-stroke designs, due to the smaller armature mass. To further increase the dynamics, in addition to an electrodynamic additional drive (cf. e.g. WO 2011/003547 A1), an increase in the number of pole pairs can also be considered to reduce the armature mass (the "armature plate" can then have a thinner design); in such a case, the frame or frames comprise(s) more than two (rotationally symmetrical construction) or three ("angled" construction) soft-magnetic parts which are set under magnetic tension with respect to one another.

Different soft-magnetic parts are by no means to be understood such that they have to be physically separate from one another. They can also, as described above, be separated from one another by fully or partially saturated regions; what is decisive is solely that the magnetic tension required between these parts or—more precisely—regions can be caused in a permanent magnetic manner.

All the drives in accordance with FIGS. 2A-E can naturally also have a rotationally symmetrical design. Drives in accordance with the present disclosure having two armatures rigidly connected to one another are in any case particularly compact; in comparison with conventional reversing linear solenoids they can be designed as smaller, often by a multiple, with respect to the construction volume, provided that the same permanent magnet material is used. If this miniaturization is dispensed with and a magnet in accordance with the present disclosure having two armature plates is made just as large as a conventional magnet, the gained construction space can be used to make use of inexpensive, but large, permanent magnets of small energy density (for example, hard ferrites) instead of small, but expensive, permanent magnets of high energy density (in particular rare earth magnets).

A further example of the present disclosure will be explained in the following with reference to a monostable reversing linear solenoid. Monostable embodiments of the present disclosure are obtained in that the reluctance force acting on the armature or on the armature system in the stationary, non-energized case is only larger than the associated spring force in the one end stroke position, but not in the other. The spring and the magnet are coordinated with one another in this respect such that the sum of spring force and reluctance force in the stationary, non-energized case ("stationary total force") has the same sign at each point of the adjustment path. In the non-energized case, the drive is therefore only stable when the armature (or the armature system) is in its one stable end stroke position. In terms of magnitude, the total stationary force (of magnetic force and spring force) has to be larger than the friction possibly acting on the system; where necessary, the associated stationary total force characteristic has to be coordinated to the respective application with respect to possible restoring forces (for example, the pneumatic pressure when the monostable drive has to overcome a pneumatic valve such as is used in automatic transmissions).

The reluctance force in the stationary, non-energized case may not be limited by magnetic saturation in the unstable end position. This means that in that magnetic part circuit which includes the adhesive surface(s) of the armature contacting the stator, magnetic saturation should by no means and in no region occur across the total effective iron cross-section. In this manner, the reluctance force in the non-energized, unstable end stroke position can be increased so far by energizing the coil(s) that the magnet is also (meta-)stable against the spring force in this ("second") end stroke position as long as the electrical power required for this purpose is utilized. The magnet here should be dimensioned such that an increase of the reluctance force which is as large as possible in the "unstable" ("second") end stroke position is reached with as little electrical power as possible—this is also important to be able to maintain the magnet in the unstable end position with high switched-on durations. As regards the spring system, it does not have to be linear. It preferably has a progressive characteristic with respect to the stable end stroke position; that is, the spring force driving the armature system in the direction of the center stroke position increases more than linearly when the armature system approaches the stable ("first") end stroke position. This can also be achieved by a combination of a plurality of linear springs.

Figure 3:
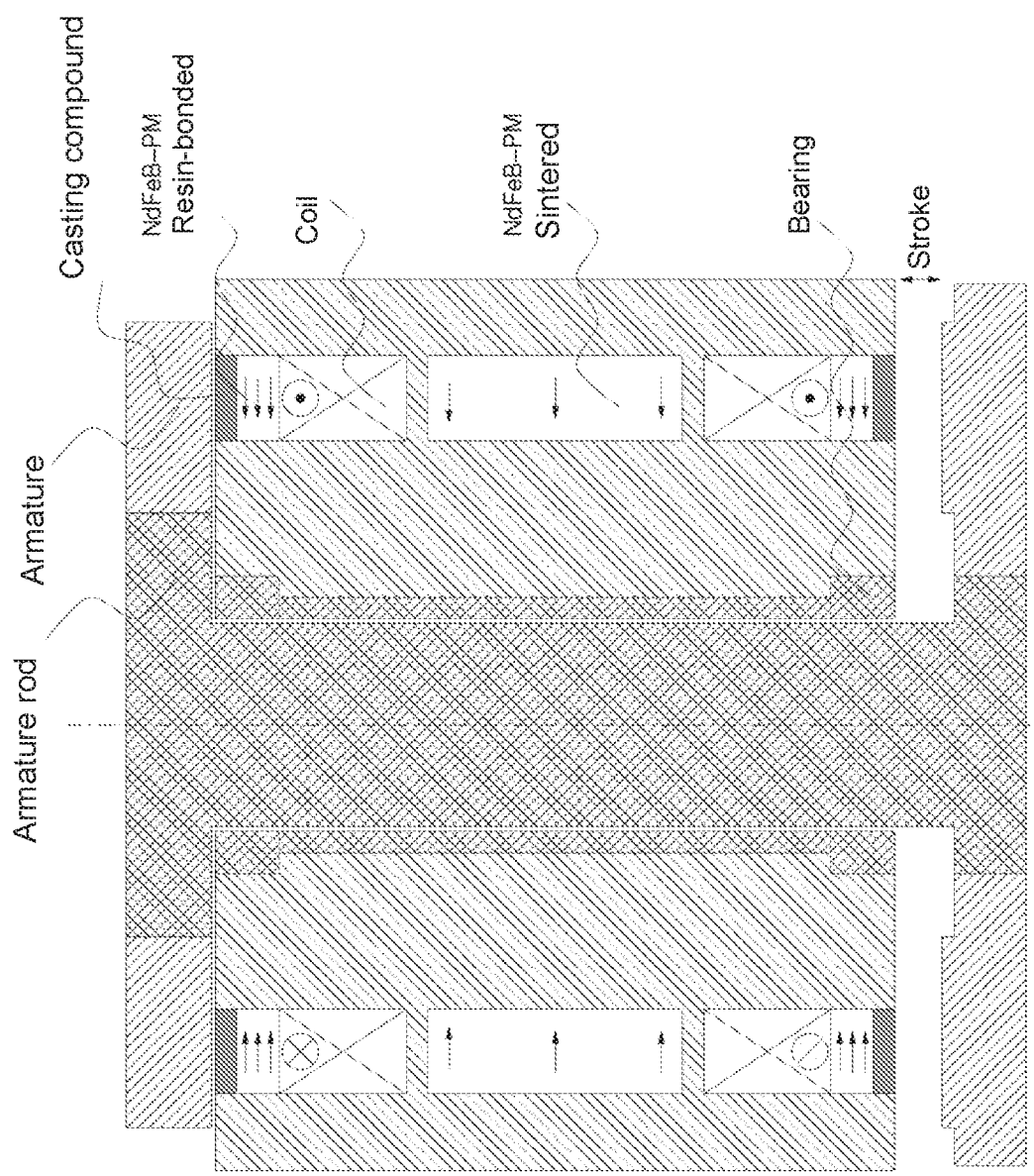
FIG. 3 shows a longitudinal section through a drive in accordance with an example of the present disclosure for illustrating the magnetic principle underlying the drive.

The magnetic principle will be illustrated with reference to FIG. 3. The lower armature in the image has a larger iron cross-section with respect to the stator than the armature at the top image. The magnetic flux produced by the permanent magnets is thus distributed across a larger cross-section with a contacting lower armature than with the upper armature. In addition, the surface of the lower armature or of the lower armature plate is structured. If the contacting regions already saturate, a magnetic flux is produced which extends almost in parallel from the non-saturated stator iron into the non-saturated armature iron (the term iron is used here as synonymous with "soft magnetic material"). This flux extending in parallel has flux densities which are smaller than the saturation flux density of the iron material used (on use of different iron materials smaller than the saturation flux density of the material having the smaller saturation flux density). An amplification of this flux by energizing the coil produces the required increase in the reluctance force. The drive in accordance with FIG. 3 is largely to scale and can be used as a basis for FEM simulations. However, for the design of the present disclosure as a monostable reversing linear solenoid having two rigidly connected armatures, these armatures (armature plates) do not have to be differently shaped. The magnet system could also be designed such that the saturation to be avoided in accordance with the present disclosure in the current-less case does not occur in any position—this is only possible, however, at the cost of the reluctance force in the "stable" position. In another embodiment, the above-described desired "magnetic" asymmetry is achieved in that, with armature plates of the same construction, differently thick anti-adhesive disks are used for each armature plate or only one anti-adhesion disk is provided, whereas one armature plate can directly contact the stator. FIG. 3 shows a schematic two-dimensional model of a monostable drive in accordance with the present disclosure (without the spring system being drawn), wherein the already addressed traverses are mapped by the magnetic short-circuits. A magnet is thus e.g. modeled in which the sintered permanent magnets are arranged about the periphery of the inner stator region in the form of radially or diametrically polarized circle segments. The inner and outer stator parts or regions are connected to one another by the so-called traverses which extend radially between the individual circle segments. In this manner, the total stator can comprise a single machine-produced part (above all SMC part) which has chambers which are separated by one another by the traverses and can be placed into the sintered PMs. The resin-bonded permanent magnets shown in FIG. 3 are likewise polarized radially or diametrically. They are not absolutely necessary, but help compensate stray losses. This compensation of stray losses can also take place at a single side of the drive by a single permanent magnetic ring; this is best the case at that side which corresponds to the stable end stroke position since here a permanent magnetic retaining force should be produced which is as high as possible and which does not have to be further increased by energizing the coil. Molded springs can be used as the spring system, which act on the armature plates from "outside" (and which are mechanically connected to the stator via a housing where necessary). The spring(s) can, however, also be constructed about the central (drive) axis or in another manner.

Figure 4:
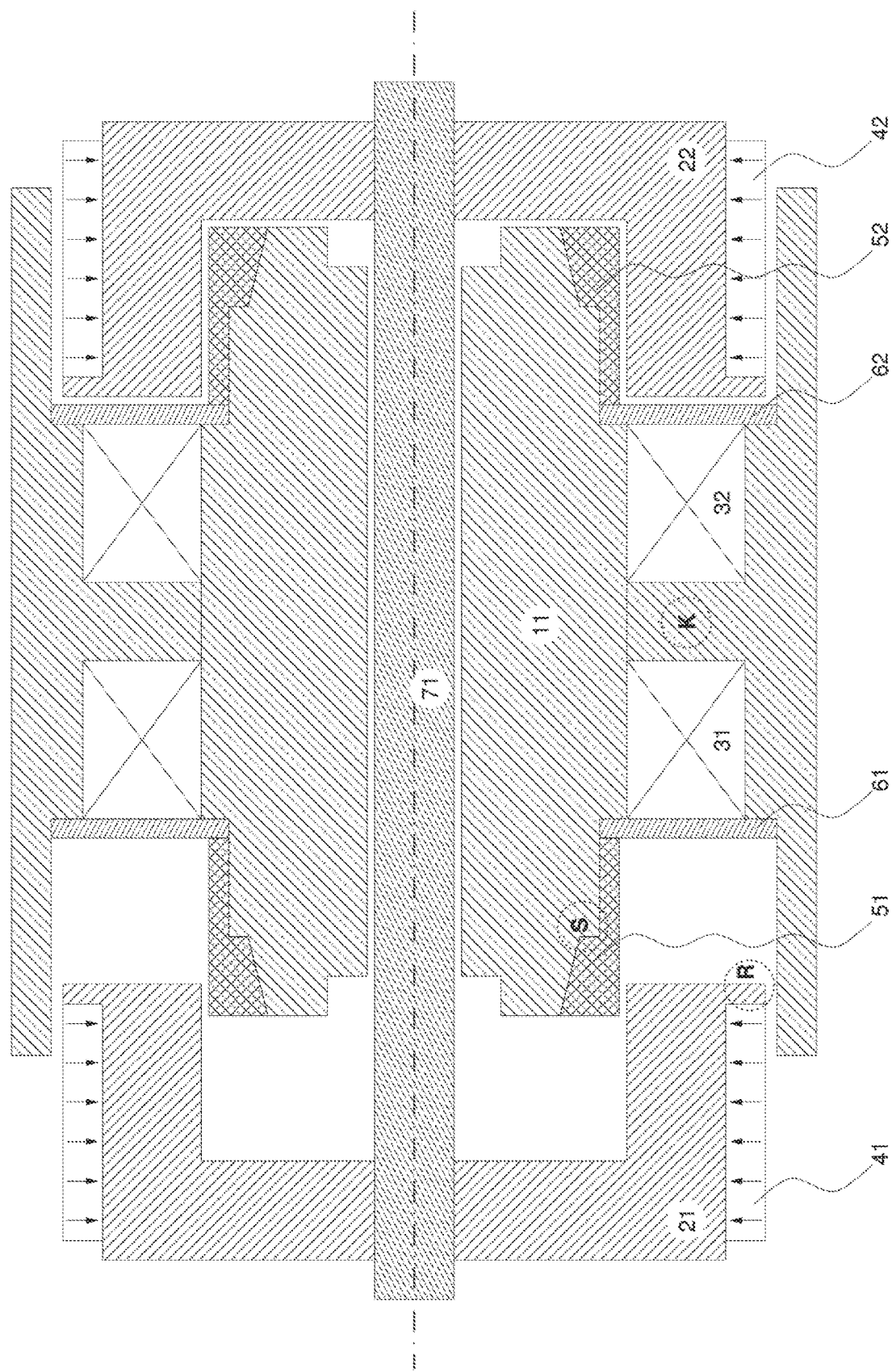
FIG. 4 shows a rotationally symmetrical embodiment of a drive in accordance with the present disclosure.

A completely different embodiment (here: a rotationally symmetrical embodiment) of a drive in accordance with the present disclosure is shown in FIG. 4; the spring system (cf. FIG. 7) may be included with the embodiment shown in FIG. 4. The magnet in FIG. 4 has a stator 11, two armatures 21, 22, two coils 31, 32 and a push rod 71 which rigidly connects the two armatures. (Note: with drives in accordance with FIG. 4, it is generally of advantage to connect the coils 31, 32 in series in the same sense). As a result of the magnetic short-circuit K, the magnet can behave as a double-stroke magnet comprising two individual magnets which are installed back-to-back and which share the same drive axis. The fastening of the permanent magnets at the armature is essential for this embodiment of the present disclosure. On the dipping of an armature into stator 11, this armature is set under a magnetic tension with respect to stator 11 with the aid of the permanent magnets. Energizing the associated coil results, in dependence on the current direction, in an attractive or repulsive force on the permanent magnet which the latter transfers to the armature. This greatly increases the design freedom of the magnet since in pure reluctance magnets, no repulsive interactions occur, at least not on the soft magnetic armature. Basically, the magnet corresponds up to this largely to a plunger coil drive in which the permanent magnet and the field coil adopt swapped roles. Differing from this, the magnet, however, has additional (radial) "air gaps" without which, as described, the armature could not be under (appreciable) magnetic tension with respect to the stator. The armatures are in any case not magnetically conductively connected to the stator 11 over too large an area. The radial air gaps forming the subject here are filled, for example, with a sliding bearing material 51, 52 (which can also serve as an emergency running bearing; in the model shown, space is provided for sliding bears at the drive axle). These required radial air gaps can be configured as in FIG. 4 to influence the characteristic line(s) of the drive in accordance with the respective use. For example, step S can serve the generation of a particularly high force slew rate in the region of the center stroke position, also in the non-energized case—this is in particular required in embodiments without a spring system under certain circumstances to prevent a stopping of the armature in a non-defined position. Without an additional air gap, no part of the magnet would be in a position to produce a retaining force with longer strokes since each armature would magnetically short-circuit its permanent magnet on too deep an immersion into the stator.

The permanent magnets can be formed, for example, as diametrically or radially polarized circle segments. A bistable drive can also be obtained with only one of the two magnets installed so-to-say back-to-back, that is with "half a drive", and indeed in that the other is replaced with a spring or spring system to be dimensioned accordingly. Such drives also do have to be of rotationally symmetrical design. Non-rotationally symmetrical variants can in addition be implemented with a transverse flux guidance to represent drives with a particularly long stroke. It is the advantage of drives in accordance with FIG. 4 that they can have remarkably high force constants with comparatively long strokes on a use of permanent magnets of high energy density. The drives are very versatile. The combination with a spring system which drives the armature system from each of the two end stroke positions in the direction of the center stroke position allows very fast drives with a high efficiency, high force constants, therefore high stroke motions and nevertheless small wear since the armature speed is substantially prevented before the reaching of the end stroke position by the spring system. If, in contrast, a spring system is dispensed with and an electrically easily conductive metal is used as the "emergency running bearing" 51, 52, the emergency running bearings simultaneously act as eddy current brakes and allow slow armature movements in which the complete stationary force is only built up at a given current as soon as the armature is held fast, for example by friction or by the load. During the adjustment process, a dynamic balance is so-to-say adopted between the drive force and the eddy current brake. The "eddy current brakes" (designed as emergency running bearings here), which can also be fastened to the armature or armatures instead of to the stator, also damp impact processes. The permanent magnets (PM) fastened to the armatures also represent a kind of magnetic spring system.

It is obvious to design rotationally symmetrical embodiments of the magnet, or at least to design those with a rotationally symmetrical inner pole from SMC materials, for high-dynamic drives in particular having mechanical springs. Parts machined from a solid material in a cutting process are better suited for the slower "spring-less" design (that is one without mechanical or pneumatic springs), above all on a use of the described eddy current brakes. The back iron R, on the one hand, allows an easy assembly of the permanent magnets for which it also serves as an abutment, but equally greatly influences the characteristic and above all increases the force at the stroke start.

Figure 5:
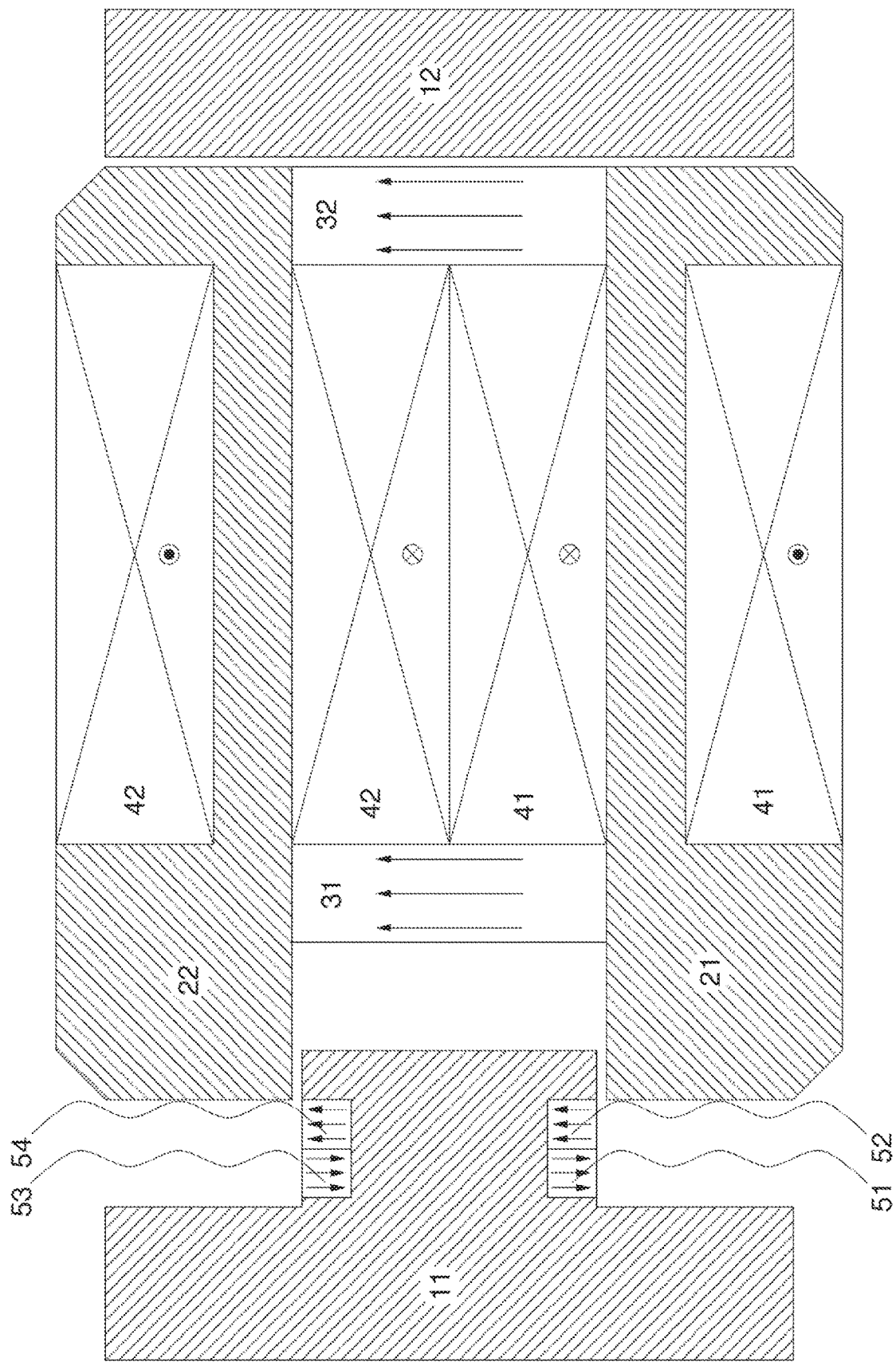
FIG. 5 shows a schematic representation of the magnetic circuit of a drive in accordance with a further example of the present disclosure.
Figure 7:
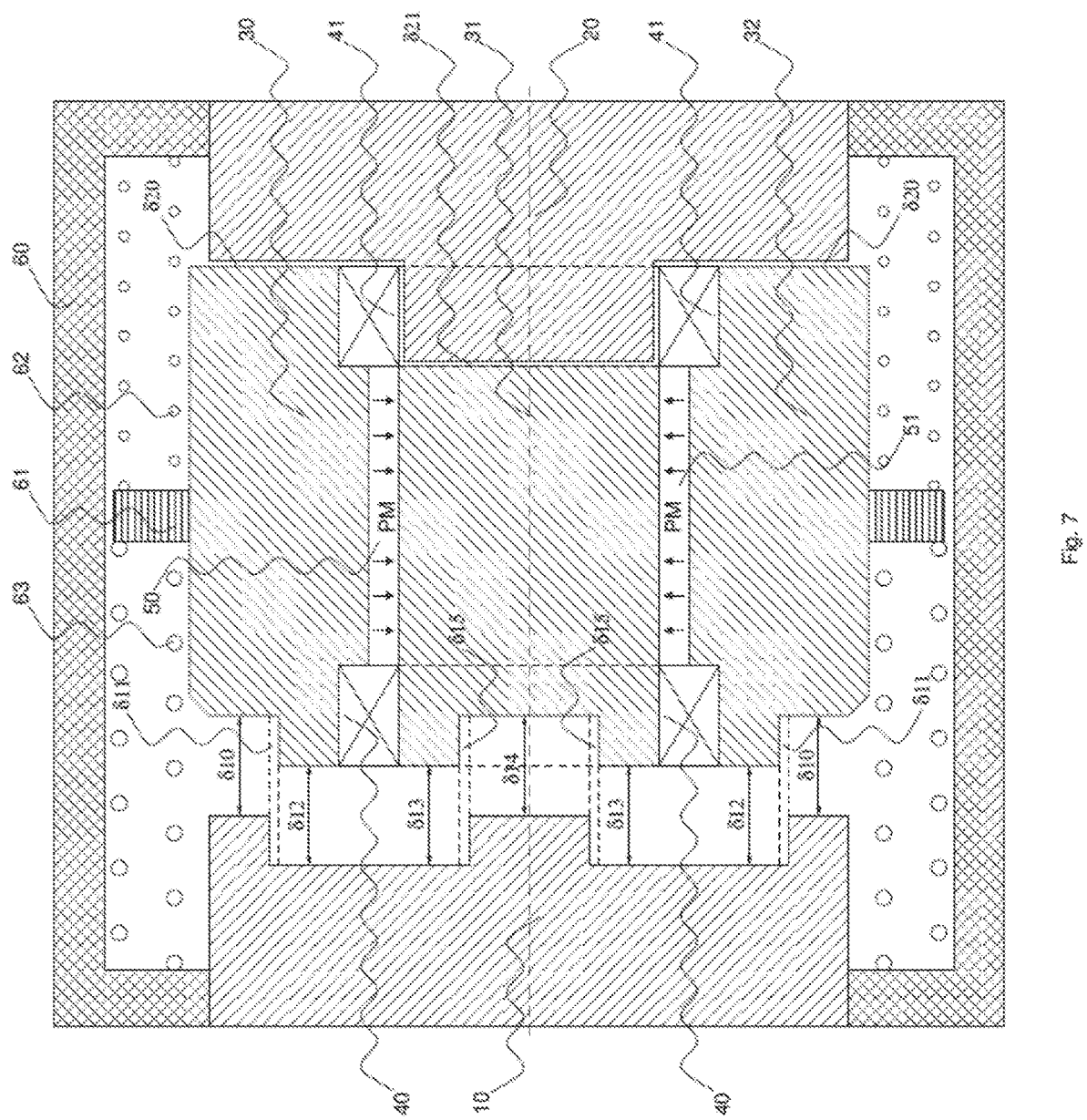
FIG. 7 shows a section, approximately to scale, in parallel with the direction of movement and in the mirror plane of a drive in an embodiment with two armatures or two armature plates, including springs and the spring system, a counter bearing, and a rigid connection, in accordance with an example of the present disclosure.

The magnetic circuit of a further embodiment of the present disclosure is shown schematically in FIG. 5. The spring system (cf. FIG. 7) may be included with the embodiment. One or more mechanical springs are preferably used here. The drawing is not to scale. Armature parts 11 and 12 are preferably to be understood as armature plates formed from metal sheet packets, said armature plates in turn having a mechanical connection which is as rigid as possible, and which is shown in FIGS. 7. 21 and 22 are stator parts which are preferably formed from metal sheet packets and which are set under a magnetic tension with respect to one another by the permanent magnets 31 and 32. The drive is operated by energizing the coils 41, 42, with a capacitor or a capacitor bank or also a PLC being able to serve as a power supply—the latter gives the advantage of being able to control the drive during the adjustment movement or of being able to regulate the movement process in dependence on the load or on the path, for example. For a further increase in efficiency, a free-running device can be used (e.g. correspondingly connected AC switches based on MOSFETs which allow a free running of the current in the coils with a separate power supply). FIG. 5 is similar to FIG. 1 from a design aspect, but has, in addition to other construction differences, above all one particular feature: Additional permanent magnets 51, 52, 53, 54 are fastened to (at least) one armature plate to influence the characteristic. The permanent magnets 51, 52, 53, 54 should be mechanically robust and have a high coercivity as well as a specific or effective conductivity which is as low as possible; resin-bonded NdFeB magnets or segmented, sintered NdFeB magnets are particularly suitable. The magnetic force acting on the permanent magnets can be interpreted as a Lorentz force acting on their "surface currents". On dipping into the stator during an adjustment movement from the starting stroke position shown in FIG. 5, the magnets 52, 54 (which has the same direction of polarization as the magnets 31, 32 with respect to the stator of 21, 22) initially sense a force which is directed against the stroke movement and which admittedly reduces the "force constant" of the drive in the region of the stroke start, but also compensates "flow losses" over the part of the armature plate 11 dipping into the stator. In return, a very high "force constant" can occur when, on a progressing stroke movement, the magnets 51, 53 start to dip into the stator which are oppositely polarized like the magnets 52, 54. It is of advantage with respect to the efficiency of the arrangement to coordinate this dipping of the magnets 51, 53 with the spring system such that it only takes place when the spring system is already largely relaxed as a result of the stroke movement and the armature system has reached a large portion of its maximum speed. In order thoroughly to use the high speed which occurs during the stroke movement, for example in the region of the center stroke position, in the described manner to increase efficiency (coordination of the force constant of the drive with the armature speed along a stroke; here not by a purely geometrical characteristic influencing, but rather by suitably arranged permanent magnets fastened to at least one armature plate), the eddy current damping is also very important in the permanent magnets and has to be designed as effectively as possible, as already mentioned, by the material choice and by construction measures. Drives derived from FIG. 1 and FIG. 5 are inter alia very suitable as replacements for pneumatic or hydraulic drawing shoe controls in drawing machines.

Figure 6:
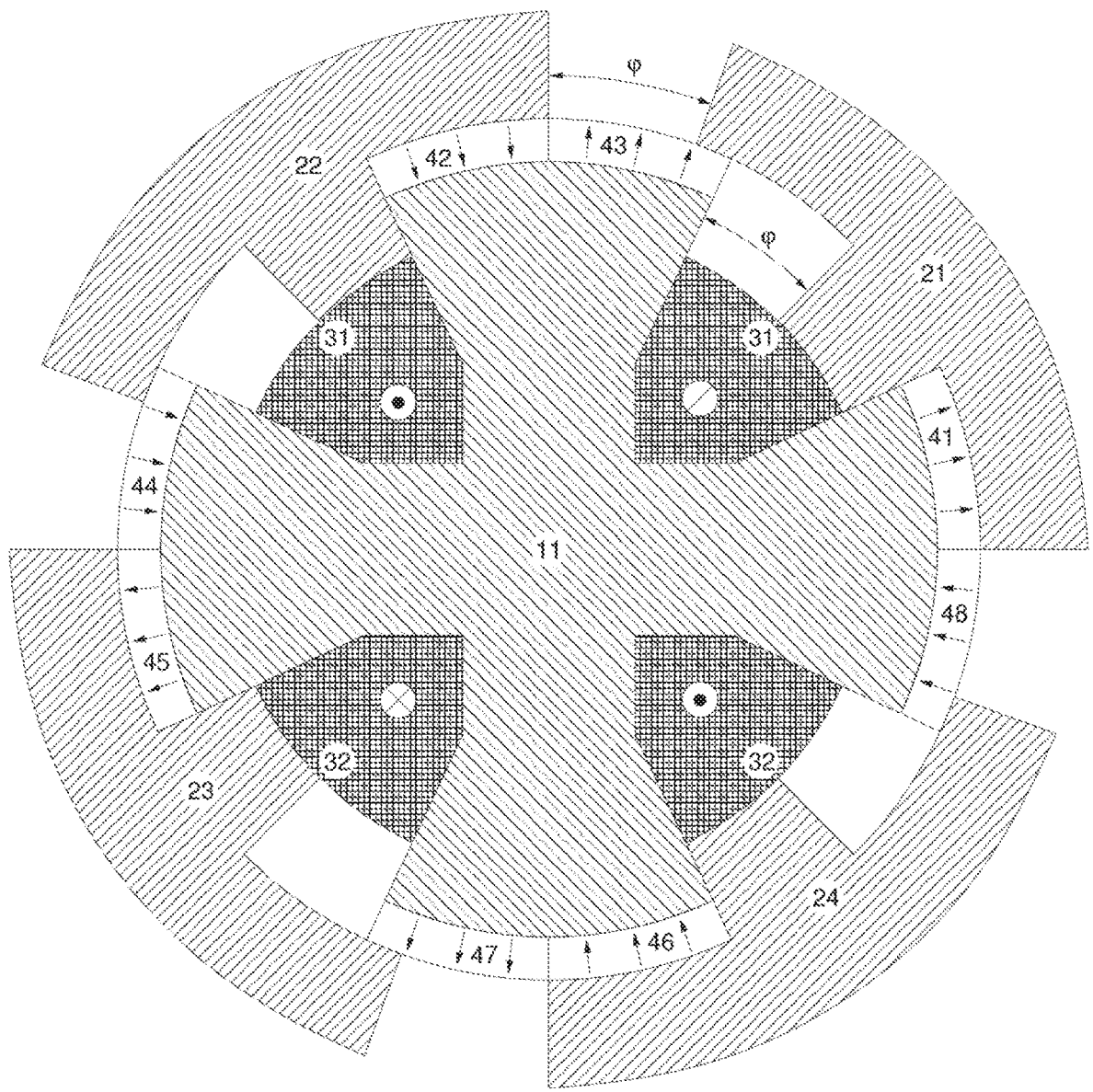
FIG. 6 shows a further example in which the drive executes a limited rotational movement.

All the embodiments of the present disclosure previously shown here were linear drives with a limited stroke. Embodiments are, however, also possible as rotary magnets which have a limited rotational movement. In this case, the term "stroke" refers to a rotational movement over a specific angular range. Drives which achieve extremely short adjustment times and high operation frequencies with a simultaneously high efficiency can easily be drafted using the drive shown schematically in FIG. 6. FIG. 6 shows the drive in cross-section. The drive can be understood as a permanently excited external rotor motor. The external rotor is formed from the soft magnetic parts 21, 22, 23, 24 which are mechanically connected to one another (connection is not shown) and which are arranged about the stator 11. The external rotor is rotatably supported about the longitudinal axis of the stator and can be equipped with the spring system shown in FIG. 7. The external rotor parts 21, 22, 23, 24 have evidently inwardly directed (that is toward the stator) tines which can come to lie at the stator in both end stroke positions. Even if no separate abutments are provided from a constructional aspect, the movement φ of the drive about is axis of rotation is bounded by the tines (in contrast to known external rotor motors). The soft magnetic parts of the external rotor are set under magnetic tensions with respect to the stator by permanent magnets 41-48, with the sign of the magnetic tension alternating about the periphery of the external rotor. The directions of polarization of the permanent magnets are drawn as arrows for illustration. In the example, the permanent magnets are fastened to the stator. They can, however, also be a part of the external rotor. FIG. 6 is generally to be understood as a general illustration of the principle and is not intended to represent any restriction. The soft magnetic parts 21, 22, 23, 24 of the external rotor and the stator are preferably manufactured from (electrical) metal sheet packets or from soft magnetic composite materials. The drive of FIG. 6 furthermore has one or more coils. An example for the possible winding sense is drawn symbolically (cross and dot in the circle). Two coils, namely 31 and 32, are drawn in FIG. 6. The stator 11 can, however, also be wound directly, as is known from electric motors. As explained, on a rotation of the external rotor about its longitudinal axis, the drive has two end positions in which the tines of the external rotor parts 21, 22, 23, 24 come to lie at the stator 11. Since in this respect, the associated (working) air gaps between the external rotor parts and the stator disappear with the exception of constructionally caused residual air gaps, a very high holding torque can be produced with the aid of the permanent magnets 41-48 (the arrangement of the permanent magnets shown in FIG. 6 furthermore also serves as an example for a characteristic influencing in a rotational embodiment of the present disclosure). In accordance with the present disclosure, the drive has a torsionally flexible spring which drives said drive out of both end stroke positions in the direction of the center stroke position. A simple torsional spring is suitable for this purpose, but also arrangements of helical springs such as are generally known from dual mass flywheels from automotive construction. The spring or the spring system generates a torque in each of the two end stroke positions which is smaller in magnitude than the associated holding torque of the drive (that is its reluctance torque in the stationary, non-energized case) and which moreover has an opposite sign. A counter-excitation by the coil(s) 31, 32 can now reduce the holding torque of the magnet (up to a sign change). Since, as said, the holding torque can be very large for construction reasons and the torque of the spring (or of the spring system) can be of a similar magnitude (with a certain safety distance so that the drive is not, for example, set into movement by accident due to vibrations), a hugely high starting torque results in sum which allows extremely high drive dynamics. An effective eddy current damping and an appropriately small inductance of the coils 31, 32 are the requirement for this. The permanent magnets should also be taken into account where possible with respect to the eddy currents. If the drive operated without load or with a small load should also have very high dynamics (measured in terms of the load), the moment of inertia of the total external rotor has to be minimized constructionally where possible.

A drive in accordance with FIG. 6 can easily reach and surpass a starting torque of 10 to 20 Nm at a diameter of 50 mm, an angle of rotation of 20° and a total length of 70 mm, such as can be calculated in a very simple estimate with the aid of Maxwell's traction force formula. Drives in accordance with the principle shown in FIG. 6, equipped with a corresponding spring system (whose moved mass equally has to be kept as small as possible), are exceptionally suitable as sorting magnets, in particular as post-sorting magnets. In this application, rotary magnets are already preferred. In comparison with the prior art, however, starting torques which are higher by one to two powers of ten (!) in comparison with the prior art are available with a comparable or even smaller power pick-up and at a much higher efficiency overall. The high efficiency is actually elementary in high-frequency sorting applications.

Some important aspects of the present disclosure are summarized in the following, with this summary not representing any exclusive list. In accordance with the present disclosure, the above-named object is satisfied in that the reversing linear solenoid has a spring system which exerts a force directed toward the center stroke position in the direction of movement on the armature in both end stroke positions. In this respect, the spring system is to be designed such that the spring force in at least one end stroke position is smaller in magnitude than the total reluctance force acting on the armature in the static, non-energized case so that the armature can be kept stable in a permanent magnetic manner against the spring force in at least one end position. For bistable magnets, the spring system is to be designed, where possible, such that the potential energy stored in the spring system is of equal magnitude in both end stroke positions and the spring force is smaller in magnitude in both end stroke positions than the associated reluctance force in the stationary, non-energized case. If the application to be provided by the reversing linear solenoid itself produces a returning force, this must be taken into account accordingly in the design of the spring system.

Drives in accordance with the present disclosure can have means for characteristic influencing if their strokes are so large that the associated working air gaps cannot be approximated as "small" in every regular operating state. Said means have to be matched with the spring system in accordance with the present disclosure. The characteristic influencing in accordance with the present disclosure can also reduce the series reluctance of the working air gaps in the case of geometrical characteristic influencing and can thus help minimize the required trigger powers.

If the drive in accordance with the present disclosure should have a particularly compact construction shape, it comprises two or more frame parts of a soft magnetic material between which a magnetic tension is generated in a permanent magnetic manner. The drive furthermore comprises at least two soft-magnetic armature plates, namely the first and second armature plates, which are rigidly connected to one another. In accordance with the present disclosure, the drive has two end stroke positions, namely a first and a second end stroke position. The drive is configured such that, in a first end stroke position, the first armature plate magnetically short-circuits the frame parts, except for unavoidable residual air gaps, whereas the working air gaps at the second armature plate are open to a maximum. In a second end stroke position, the second armature plate correspondingly magnetically short-circuits the frame parts and the working air gaps at the first armature plate are open to a maximum. A compulsory displacement of the armature plates rigidly connected to one another from the first end stroke position into the second accordingly has the result that the flux produced in a permanent magnetic manner primarily commutates from the first to the second armature plate. (The working air gaps of both armature plates (toward the frame) are connected magnetically in series with one another with respect to the magnetic flux produced with the aid of the drive coil(s). With respect to the flux produced in a permanent magnetic manner, the named working air gaps are connected magnetically in parallel, i.e. the working air gaps of the first armature plate are connected in parallel to those of the second armature plate with respect to the second armature plate).

The invention claimed is:

1. A drive having a reversing linear solenoid which is polarized in a permanent magnetic manner, the reversing linear solenoid having a frame, an armature or armatures, at least one air gap formed between the frame and the armature or armatures, at least one permanent magnet, and at least one excitation coil, wherein the permanent magnet creates a magnetic flux in the air gap, wherein the excitation coil creates a magnetic flux in the same air gap as the permanent magnet, such that the magnetic flux created by the permanent magnet in the air gap can be at least partly compensated by counter-excitation of the excitation coil, and wherein the reversing linear solenoid has a first and a second end stroke position, a center stroke position disposed between the end stroke positions and the armature or armatures, wherein the drive has a spring system which exerts a force in a direction of the center stroke position on the armature or at least one of the armatures in each of the two end stroke positions, wherein the spring system and the reversing linear solenoid are coordinated with one another such that the armature or at least one of the armatures is held in a permanent magnetic manner against a spring force in each of the two end stroke positions in a static, non-energized case, wherein the spring system is designed such that potential energy stored therein by movement of the armature or armatures in its/their end stroke positions is of equal magnitude in both end stroke positions, and wherein a first face of the armature or armatures abutting a first face of a frame in the first end stroke position has a first geometry different from a second geometry of a second face of the armature or armatures abutting a second face of the frame in the second end stroke position.

2. The drive in accordance with claim 1, wherein the first face of the armature or armatures and the first face of the frame facing the first face of the armature or armatures have matching geometric profiles formed so that a second permanent magnetic retaining force in the second end stroke position is reduced with respect to a first permanent magnetic retaining force in the first end stroke position.

3. The drive in accordance with claim 2, wherein the second face of the armature or armatures and the second face of the frame facing the second face of the armature or armatures have no geometric profiles or second matching geometric profiles different from and reduced with respect to the matching geometric profiles.

4. The drive in accordance with claim 3, wherein the geometric profiles are designed such that an increased reluctance force is generated at zero points of a spring function of the spring system on an energizing of a drive coil.

5. The drive in accordance with claim 3, wherein the drive comprises a first armature and a second armature rigidly connected to the first armature, the first and second armatures being arranged on opposite sides of the frame, wherein the first face of the armature or armatures is arranged on the first armature and the second face of the armature or armatures is arranged on the second armature, and wherein the first face and the second face are arranged on opposite sides of the frame.

6. The drive in accordance with claim 1, comprising:
two or more soft magnetic frame parts or frame regions;

one or more permanent magnets which set the two or more frame parts or frame regions under a magnetic tension with respect to one another which has the consequence of a magnetic flux;

a first soft magnetic armature part and a second soft magnetic armature part rigidly connected to one another, wherein at least one working air gap between the respective armature part and a frame part is associated with each armature part;

a first end stroke position in which the first armature part magnetically short-circuits the frame parts, while the working air gap or gaps are open to a maximum at the second armature part;

a second end stroke position in which the second armature part magnetically short-circuits the frame parts, while the working air gap or gaps are open to a maximum at the first armature part;

at least one field coil for generating a magnetic flux, wherein the drive is constructed such that a movement of the armature parts, synchronized by their rigid connection, from the first end stroke position into the second end stroke position has the effect that the flux produced in a permanent magnetic manner largely commutates from the first armature part to the second armature part and vice versa;

wherein the at least one field coil is arranged such that its/their energizing weakens the magnetic flux produced in a permanent magnetic manner and which passes through the one armature part and amplifies the magnetic flux which passes through the other armature part; and wherein the armature parts are connected magnetically in parallel with respect to the magnetic flux produced in the permanent magnetic manner, but are connected magnetically in series with respect to the magnetic flux produced by the at least one field coil.

7. The drive in accordance with claim 6, wherein one or both armature parts forms or form an armature/armature counterpiece system with the frame parts or frame regions for a geometrical characteristic influencing.

8. The drive in accordance with claim 6, further comprising a characteristic influencing, instead of or in addition to a geometrical characteristic influencing, wherein permanent magnets, coils or short-circuit windings are fastened to the armature or armatures parts.

9. The drive in accordance with claim 6, wherein the frame parts are formed by metal sheet packets or SMC.

10. The drive in accordance with claim 6, wherein the armature parts are configured as armature plates formed from metal sheet parts or SMC.

11. The drive in accordance with claim 6, wherein the armature parts are made from a solid soft magnetic material into which slits are introduced for damping eddy currents.

12. The drive in accordance with claim 11, wherein the armature parts have a specific electrical resistance which is at least twice as high as that of pure ferritic iron.

13. The drive in accordance with claim 6, which is of a rotationally symmetrical design with respect to an axis of rotation and which has a single frame manufactured in a powder injection molding process from a soft magnetic composite material, wherein the frame parts under the magnetic tension with respect to one another are formed as a result of a magnetic saturation of the frame.

14. The drive in accordance with claim 13, wherein the two armature parts are rigidly connected to one another by a rod which is guided along the axis of rotation by the rotationally symmetrical frame, with the rod being soft magnetic.

15. The drive in accordance with claim 14, wherein the spring system is arranged within the frame, the spring system having spiral compression springs which surround the rod and which are abutted directly or indirectly at the frame.

16. The drive in accordance with claim 1, wherein the spring system and a magnet are coordinated with one another such that a sum of a reluctance force and a spring force in a stationary, non-energized case has the same sign at each point of an adjustment path of the drive.

17. The drive in accordance with claim 1, wherein the spring system has a progressive, non-linear characteristic with respect to a non-energized stable end stroke position, such that a spring constant increases continuously or discontinuously on an approaching of the armature or armatures to the non-energized, stable end stroke position.

18. The drive in accordance with claim 1, wherein the drive is configured for driving a pneumatic valve and has a spring for clearance compensation between a valve part and a drive part.

19. The drive in accordance with claim 1, the drive configured for driving a transmission valve.

20. The drive in accordance with claim 1, wherein the drive is configured for driving a latching unit.

21. An application comprising a drive having a reversing linear solenoid which is polarized in a permanent magnetic manner, the reversing linear solenoid having a stator, an armature or armatures, at least one air gap formed between the stator and the armature or armatures, at least one permanent magnet, and at least one excitation coil, wherein the permanent magnet creates a magnetic flux in the air gap, which can be at least partly compensated by counter-excitation of the coil, and wherein the reversing linear solenoid has a first and a second end stroke position and a center stroke position disposed between the end stroke positions, wherein the drive has a spring system which exerts a force in a direction of the center stroke position on the armature or at least one of the armatures in each of the two end stroke positions, wherein the spring system and the reversing linear solenoid are coordinated with one another such that the armature or at least one of the armatures is held in a permanent magnetic manner against a spring force in each of the two end stroke positions in a static, non-energized case, and wherein a first face of the armature or armatures abutting a first face of a frame in the first end stroke position has a first geometry different from a second geometry of a second face of the armature or armatures abutting a second face of the frame in the second end stroke position, wherein the application acts with external returning force on the drive, and wherein the spring system is designed such that potential energy stored therein by movement of the armature or armatures in its/their end stroke positions is of equal magnitude in both end stroke positions when taking account of the external returning force.

22. The application of claim 21, wherein the application comprises a second spring system creating the external returning force.

* * * * *